No. 12,402. REISSUED NOV. 7, 1905.

H. LUTZ.

VEHICLE TIRE.

APPLICATION FILED JULY 10, 1905.

WITNESSES:

A. L. Lord

Bowman & Bedeck.

INVENTOR.

Henry Lutz

BY

Foulds & Hull ATTORNEYS

UNITED STATES PATENT OFFICE.

HERBERT LUTZ, OF HAMILTON, CANADA, ASSIGNOR OF TWO-FIFTHS TO BENJAMIN HARRIS, OF HAMILTON, ONTARIO, CANADA.

VEHICLE-TIRE.

No. 12,402. Specification of Reissued Letters Patent. Reissued Nov. 7, 1905.

Original No. 767,949, dated August 16, 1904. Application for reissue filed July 10, 1905. Serial No. 269,135.

*To all whom it may concern:*

Be it known that I, HERBERT LUTZ, a citizen of the Dominion of Canada, residing at 245 Emerald street, in the city of Hamilton, in the county of Wentworth, in the Province of Ontario, Canada, have invented certain new and useful Improvements in Vehicle-Tires; and I do hereby declare that the following is a full, clear, and exact description of the construction and operation of the same.

My invention relates to improvements in vehicle-tires, and particularly in those adapted for use with automobiles.

The object of the invention is to construct a tire of this type which while possessing the resilient qualities of the ordinary pneumatic tire will be less expensive of production and of far greater durability than such tire and will possess the advantage of adaptability of being tightened or expanded to suit the load to be carried, which cannot be accomplished with solid-rubber tires. I attain these objects by the constructions illustrated in the accompanying drawings, in which—

Figure 1:
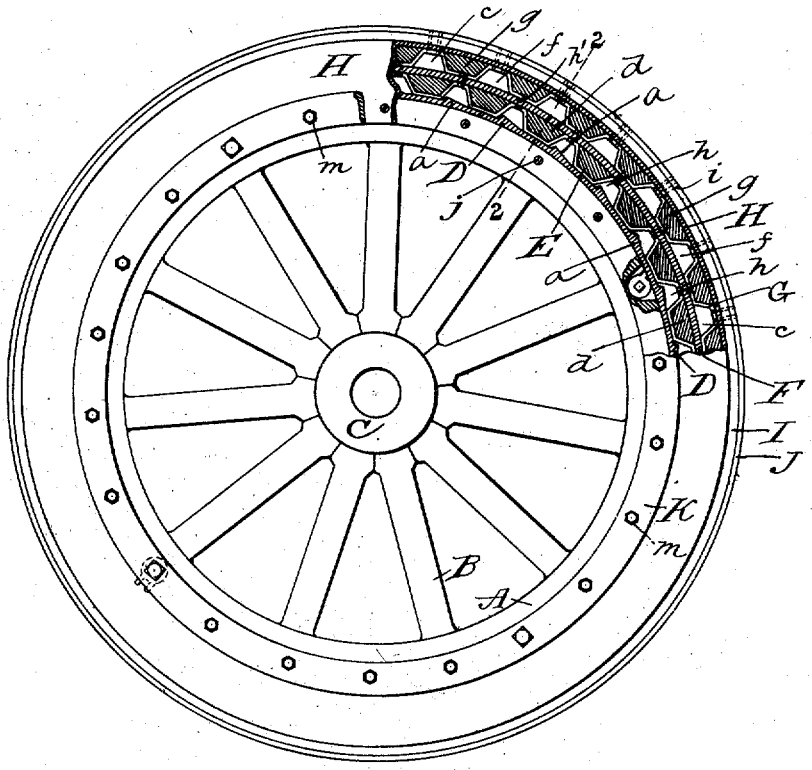
Figure 3:
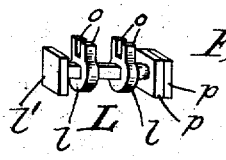
Figure 4:
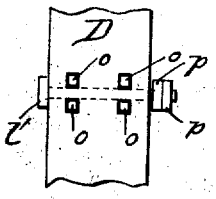
Figure 2:
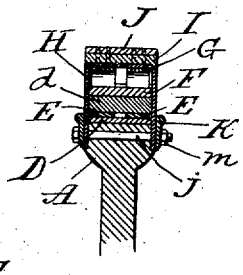
Figure 5:
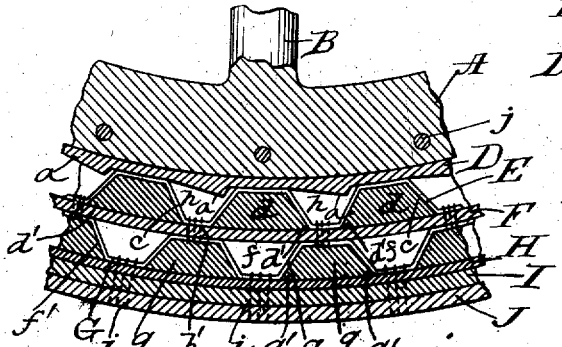

Figure 1 represents a plan view, partly in section, of a vehicle wheel and tire embodying my invention. Fig. 2 represents a cross-section of the rim or tire; Fig. 3, a perspective view of one of the tightening devices and bolts which I employ with my tire. Fig. 4 is a top plan view of such tightening device and bolt, showing the same applied to the tightening-strip; and Fig. 5 is an enlarged sectional detail of the rim and tire.

Similar letters refer to similar parts throughout the several views.

In the drawings, A represents the felly or rim of a wooden wheel of any desired size and thickness; B, the spokes, which may be of iron or wood.

C is the hub, which may be of iron or wood.

D is a loose strip, preferably metal, about one-sixteenth of an inch thick and the full width of the rim, placed around the felly. It is provided with a series of wedge-shaped projections *a* on its outer side, which are used for tightening up the tire, as will be further described hereinafter.

E E are two strips of a material—such as leather, canvas, or like substances—made to encircle the rim over the strip D, and they are corrugated, so as to leave a series of recesses between the strip D and the surrounding band F, said recesses being arranged upper and lower alternately. The lower or inner recesses *h* are for the purpose of affording room for the wedge-shaped projections *a* on the loose strip D to operate in and the outer recesses *e* to each receive a cushion *d* of an elastic substance, such as rubber or its equivalent material. On the outside of the said rubber cushions *d* is the band F above referred to, said band being of a material such as leather made to cover the said cushions entirely around the wheel. On the outside of said band is placed another pair of strips G formed with a series of corrugations extending between the band F and a covering H. The inner recesses *f* provide air-spaces adjacent the band F, and the larger recesses *f'* on the outer side contain rubber cushions *g* or equivalent elastic material. The corrugated strips E G are fastened together with the band F by a series of groups of nails, rivets, or stitches *h'*, extending therethrough. The casing H is of leather, canvas, or like material made to inclose the parts hereinbefore described to exclude dust and like substances from entering the tire.

I is a band or belt of leather or like material encircling the casing H as an outer tire to take off the wear and tear of the tire, and an extra outer tire J, of leather or like material, is placed on and over the said band or belt I, and the bands are secured together with strips G by means of nails, rivets, or stitching *i*.

K K are metal bands bolted to the sides of the felly or rim A, the bolts *j* passing through both bands and the felly. This holds the leather or other covering matter L in a firm and solid manner. The said bolts *j* are tightened by nuts *m*.

As will appear more particularly from Figs. 1 and 5, the blocks or cushions *d* are somewhat wedge-shaped, the bases or inner bearing-surfaces being smaller than the outer surfaces of the same, whereby the ends *d'* overhang the bodies of the cushions. The bases of the outer blocks of cushions *g* are opposite the recesses formed between the inner blocks *d*, with the base of each of said blocks *g* overlapping the overhanging ends *d'* of the inner blocks or cushions. With this construction and arrangement of blocks or cushions it follows that when the tire is being rolled along the ground the overhanging ends *g'* of the outer blocks or cushions will yield as pressure is brought to bear upon them. When pressure is brought to bear upon the main body of such blocks or cushions, it is transmitted through the bands F to the ends $d'$ of the inner blocks or cushions $d$, which overhang the bodies of the blocks or cushions in the same manner as do the ends $g'$ of the outer blocks of cushions. Owing to this construction, the resilient qualities of a pneumatic tire are secured.

The means for tightening and loosening the tire may be described as follows: L is a tightening device consisting of two plates $l\,l$, having each a square central opening for admitting a correspondingly-shaped bolt. Each of said plates $l$ is provided with two spaced projections $o\,o$. Said device is let into recesses in the face of the rim or felly, so that the pairs of projections $o$ are made to enter corresponding openings in the metal strip D for the purpose of expanding and loosening the tire when the square bolt-head $l'$ is turned, as by a wrench, the inner ends of the blocks or cushions $d$ riding up or down the inclined surfaces of the wedges, according to the direction in which the strip D is turned. On the end of the bolt opposite the head $l$ locking-nuts $p\,p$ are provided.

In assembling, the central band F may be somewhat loosely fitted, so as to be capable of being tightened, if desired, by the strip D.

Having thus described my invention, what I claim as new, and desire to secure by Letters Patent, is—

1. A tire for vehicles comprising inner and outer concentric series of elastic cushions or blocks, the outer edges of each of said blocks overhanging the body portion thereof, substantially as specified.

2. A tire for vehicles comprising inner and outer concentric series of elastic cushions or blocks, the outer edges of each of said blocks overhanging the body portion thereof and the blocks or cushions of one series being staggered with respect to those of the adjacent series, substantially as specified.

3. A tire for vehicles comprising an inner and an outer series of substantially wedge-shaped elastic cushions or blocks, the outer ends or corners of each of said blocks overhanging the body portion thereof and the blocks of one series being radially staggered with respect to those of the other series, substantially as specified.

4. A tire for vehicles comprising an inner and an outer series of elastic blocks or cushions, the blocks of one series being staggered with respect to the blocks of the other series, the inner faces of the blocks of the outer series overlapping the outer edges of the adjacent blocks of the inner series, substantially as specified.

5. A tire for vehicles comprising an inner series of elastic blocks or cushions, the outer edges of each of said blocks overhanging the body portion thereof and an outer series of blocks or cushions staggered with respect to the blocks or cushions of the inner series and having their inner faces overlapping the said edges of the blocks of the inner series, substantially as specified.

6. A tire for vehicles comprising an inner series of elastic blocks or cushions, the outer edges of each of said blocks or cushions overhanging the body portion thereof and an outer series of similarly-shaped blocks or cushions staggered with respect to the blocks or cushions of the inner series and having their inner faces overlapping the outer edges of such inner blocks or cushions, substantially as specified.

7. A tire for vehicles comprising an inner series of blocks or cushions, the outer edges of each of said blocks or cushions overhanging the body thereof, an outer series of separated blocks or cushions staggered with respect to the blocks or cushions of the inner series, and a band interposed between said series of blocks, substantially as specified.

8. A tire for vehicles comprising an inner and an outer series of elastic blocks or cushions, the outer edges of each of said blocks or cushions projecting beyond the body thereof, the blocks or cushions of one series being staggered with respect to those in the other series, and a band between said series of blocks, substantially as specified.

9. A tire for vehicles comprising an inner and an outer series of outwardly-tapering elastic blocks or cushions, the blocks of one series being staggered with respect to those in the other series, substantially as specified.

10. A tire for vehicles comprising an annular series of elastic blocks or cushions, a band surrounding and inclosing said blocks or cushions, and a strip secured to said band, pockets being formed between said strip and band for said blocks or cushions, substantially as specified.

11. A tire for vehicles comprising an annular series of elastic blocks or cushions, each of said blocks having its ends or corners overhanging the body thereof, a band encircling said blocks or cushions, and a strip, pockets being formed between said strip and band for the reception of said blocks or cushions, said strip being interposed between the band and the rim or felly of the wheel, substantially as specified.

12. The combination with the rim or felly of a vehicle-wheel, a tire surrounding the same, of a tightening device interposed between said rim or felly and said tire, said tightening device having a series of inclined faces adapted to engage said tire, substantially as specified.

13. The combination with the rim or felly of a vehicle-wheel, of a tire surrounding said rim or felly, said tire comprising a series of blocks, a tightening-band surrounding said rim or felly intermediate of the same and the blocks, said band having a series of inclined surfaces adapted to engage said blocks, and means for imparting rotary movement to said band, substantially as specified.

14. The combination with the rim or felly of a vehicle-wheel, of a series of blocks or cushions surrounding said rim or felly, an inclosing casing for said blocks or cushions, a band surrounding said rim or felly intermediate of the same and said blocks or cushions, said band having inclined surfaces thereon adapted to engage said blocks or cushions, means for imparting rotary movement to said band, and means for locking said band in position, substantially as specified.

15. The combination, with the rim or felly of of a vehicle-wheel, of a tire therefor comprising a band, a series of elastic blocks or cushions intermediate said band and said rim or felly, a strip secured to said band, pockets being formed between said strip and band, an outer band, a series of elastic blocks or cushions intermediate said bands, and a strip having pockets therein for the latter series of blocks or cushions and secured to said outer band, substantially as specified.

16. The combination, with the rim or felly of a vehicle-wheel, of a tire therefor comprising a band exterior of said rim or felly, and an intermediate elastic portion having recesses adjacent the rim or felly, and an adjusting-strip surrounding the rim or felly and having a series of inclined projections extending into said recesses, said strip being adapted to be rotated to adjust the elastic portion toward or from the band, substantially as specified.

17. The combination, with the rim or felly of a vehicle-wheel, of a tire therefor comprising a band, an annular series of blocks having recesses therebetween, an adjusting-strip surrounding and resting on said rim or felly, said strip having a series of wedge-shaped inclined projections extending into said recesses, a bolt extending through said rim or felly adjacent the outer periphery thereof, said bolt being provided with projections engaging corresponding openings in said strip, said bolt being provided with an operating portion and with a lock-nut, substantially as specified.

18. In combination with the felly of a vehicle, a tire consisting of a loose metallic strip on the outside of the felly constructed with a series of wedge-shaped projections on the outer side, a corrugated strip of material as leather, placed over the said metallic strip, the under recesses or compartments for the said wedge-shaped projections, rubber cushions to fill the upper recesses, a loose central band of material as leather, placed over the said rubber cushions, then a second corrugated band of leather or like material, placed over the said central strip, and incased on the outside and sides with a covering of leather or like material, then on the outside a thick covering band or belt of leather or like material, and on the extreme outside another thick band or belt placed over all as an outside tire and the parts all well secured together by nails or rivets forming an improved tire that will be at once elastic, durable and punctureless, substantially as described.

19. In combination with the felly of a vehicle a tire consisting first of a loose metallic strip, capable of being tightened and slackened as desired placed on the outside of the rim or felly of a vehicle-wheel the said strip constructed with a series of wedge-shaped projections on the upper side, a corrugated strip of material as leather placed over the said metallic strip, the projections of the said strip made to lodge in the lower or under recesses of the corrugated belt, and the upper or outward recesses of the belt to contain a series of elastic cushions as rubber, a central band of tough material as leather is placed loosely over the said rubber cushions, then a second corrugated band with upper and lower recesses of tough material as leather is placed over the said central strip, the whole being incased on the outside and sides with a covering of a tough material as leather, and on the extreme outside of the wheel two separate bands or belts placed over all and secured together for an outside protection of the inside parts, and devices for tightening or slackening the tire, substantially as and for the purpose specified.

In testimony whereof I affix my signature in the presence of two witnesses.

HERBERT LUTZ.

Witnesses:
W. H. STEPHENSEN,
CHARLES R. FORD.